July 9, 1940.  C. E. CLARK  2,207,238
CHUCK
Filed Oct. 19, 1938
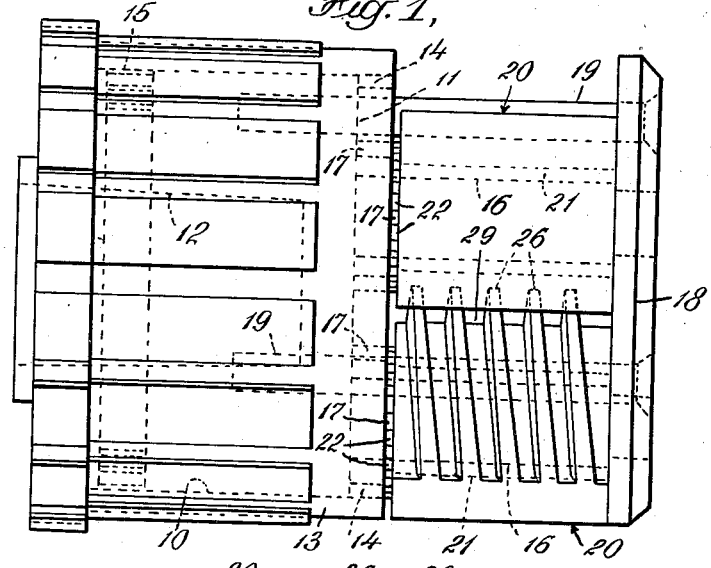
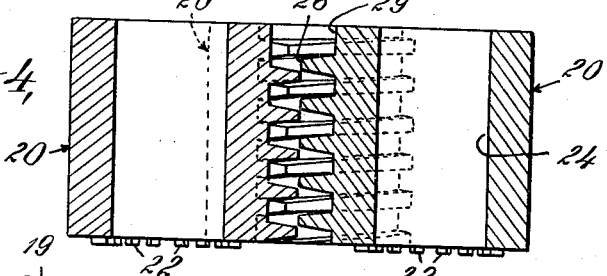
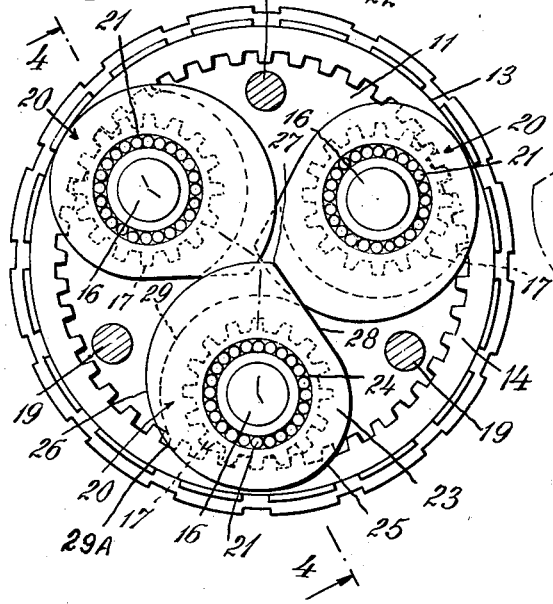
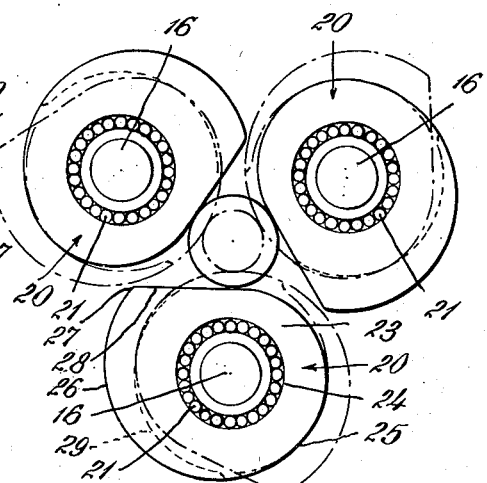
INVENTOR
Charles Edward Clark
BY
Marshall & Hawley
ATTORNEYS Patented July 9, 1940

2,207,238

UNITED STATES PATENT OFFICE 2,207,238

CHUCK

Charles Edward Clark, West Hartford, Conn., assignor to The Jacobs Manufacturing Company, Hartford, Conn., a corporation of Connecticut Application October 19, 1938, Serial No. 235,792

2 Claims. (Cl. 279—33)

This invention relates to improvements in chucks, of the type which depend upon the simultaneous rotation of a plurality of eccentric gripping jaws for engaging a tool. In order to make the jaws movable in such a way that the tool gripping parts of them can be moved into or close to a common axis so that they may grip tools of small diameter, it is necessary to space such parts relatively on the several jaws to prevent them from interfering with one another. This necessitates cutting away intermediate parts of the jaws and reduces their gripping areas. Heretofore, such alternate gripping and cut-away parts of the jaws have been arranged normal to the axes of the jaws to form ribs which are rectangular in cross section. The gripping areas of such ribs are the same for different sizes of the tools which they engage, with the result that smaller tools are engaged by greater areas of the ribs than are required and larger tools by smaller areas than are required.

Another difficulty with former constructions is that the angularly spaced tool gripping parts of the jaws are so far apart longitudinally that there is a tendency to bend the tool and to make it run out of true.

The object of my invention is to overcome these objections and to provide a simple structure by which the tools are gripped more effectively. This I accomplish by the simple expedient of tapering the projecting eccentric rib-like parts of the jaws longitudinally so that their parts which engage larger tools are wider than their parts which engage smaller tools. I also increase the width of the gripping areas of the ribs by making them in the form of helices of like pitch, with the projecting part of each helix disposed opposite the depressed portions of the two adjacent helices. By this arrangement the gripping areas of the jaws are increased and the longitudinal distances between the gripping surfaces decreased.

I will describe an embodiment of my invention in the following specification and point out its novel features in appended claims.

Referring to the drawing:

Fig. 1 is a side elevation of a chuck which is made according to and embodies my invention;

Fig. 2 is a front elevation of the chuck shown in Fig. 1, with its front plate removed and with the clamping jaws in their inner position;

Fig. 3 is a front elevation of the clamping jaws, showing them in full lines in their outer or most widely open position and in dotted lines in an intermediate position; and Fig. 4 is a sectional elevation of two of the jaws, showing their inter-related positions. The section is taken on the line 4—4 of Fig. 2.

10 designates the substantially cylindrical body of a chuck having a transverse face 11. This body has a tapered bore 12 at its rear end which is adapted to fit a driven arbor in a machine tool, such as a power drill. 13 is a sleeve rotatably supported on the body 10. At its front end is an internally toothed flange 14 which overlaps the outer face 11 of the body. The sleeve is biased to rotate on the body in an anticlockwise direction by a spring 15. A suitable stop (not shown), is provided to limit the relative rotation of the sleeve on the body in this direction. 16 designates posts projecting from the body 10. As shown, these are equally spaced angularly and from the axis of the body and are parallel with this axis. The outer ends of the posts pass through openings in a centrally perforated front plate 18 which is fastened to the body 10 by screws 19. Pinions 17 which mesh with the gear on flange 14 are rotatively supported on the posts 16. These are somewhat wider than the flange so that they project beyond its outer surface.

20 designates the clamping jaws. These are rotatively supported on the posts 16 with interposed roller bearings 21. Each clamping jaw is provided with a ring of short teeth 22 which engage the projecting parts of the pinions 17. The clamping jaws are held on the posts by the front plate 18.

The foregoing parts are but briefly described as they accord substantially with the construction more fully shown and described in the application for patent, Serial No. 218,111, filed by Arthur Merrick Stoner July 8, 1938.

My improvement resides in the novel construction of the clamping jaws. In common with the clamping jaws shown in application Serial No. 218,111, these comprise bodies 23 having cylindrical bores 24 with eccentric portions 25 and spaced eccentric ribs 26 which terminate at edges 27 from which they are cut back, as at 28 (Fig. 2), to the parts of the body portions 23 which are nearest the axes of the bores. The parts 29 of the bodies which are between the ribs are cylindrical, but curve outwardly, as at 29A, into the eccentric body portions 25 to increase the solid portions of the jaws and to shorten the ribs 26.

According to my invention, the ribs are tapered longitudinally and transversely. They are positioned helically and are of such a pitch that the ribs on one jaw come between the ribs of each adjacent jaw. During the operation of the chuck the rotative movement of all of the jaws is uniform and in the same direction so that this relative position of the ribs is maintained. Moreover, the width of the ribs is but slightly less than that of the spaces between them so that the ribs present gripping lines, nearly one-half of those presented by the solid eccentric parts 25 of the jaws.

The chuck may be easily operated while in rotation. A slight pressure of the hand on the sleeve 13 is sufficient to move the jaws from their fully closed position shown in Fig. 2 in a clockwise direction toward their fully opened position shown in full lines in Fig. 3. Then a tool is inserted and the hand released. The spring moves the jaws inwardly and the grip on the tool is instantaneous and self-tightening.

Structural modifications may be made within the scope and spirit of this invention. The entire eccentric portion of the gripping jaws, for example, may be formed of helical ribs projecting from a cylindrical body. Furthermore the advantage of tapering the ribs longitudinally may be retained with structures in which the ribs are normal to the axes of the jaws. I intend no limitations other than those imposed by the appended claims.

What I claim is:

1. A chuck of the character comprising a plurality of angularly spaced rotatively supported chuck jaws having ribs extending eccentrically from said jaws in relatively staggered overlapping relations and forming gripping surfaces, said ribs being uniformly tapered in cross section to thereby make the area of their gripping surfaces greater at the portions thereof nearer the axes of rotation.

2. A chuck of the character comprising a plurality of angularly spaced, rotatively supported chuck jaws having helically disposed ribs extending eccentrically from said jaws in relatively staggered overlapping relations and forming gripping surfaces, said ribs being uniformly tapered in cross section to thereby make the area of their gripping surfaces greater at the portions thereof nearer the axes of rotation, and the helical disposition of the ribs increasing the width of the gripping surfaces.

CHARLES EDWARD CLARK.